United States Patent

Donahue

[11] 4,025,208
[45] May 24, 1977

[54] CLEVIS

[76] Inventor: Carroll F. Donahue, 1924 Russell, Dearborn, Mich. 48126

[22] Filed: Sept. 8, 1975

[21] Appl. No.: 611,128

[52] U.S. Cl. .............................. 403/157; 403/284; 403/243

[51] Int. Cl.² ................... F16C 11/06; F16D 1/12; F16J 1/16

[58] Field of Search .......... 403/274, 284, 278, 282, 403/242, 157, 158, 159, 240, 243

[56] References Cited

UNITED STATES PATENTS

| 123,680 | 2/1872 | Craig | 403/242 |
| 510,267 | 12/1893 | Kelly | 403/274 |
| 2,034,935 | 3/1936 | Anderson | 403/282 |

FOREIGN PATENTS OR APPLICATIONS

| 145,336 | 2/1952 | Australia | 403/242 |
| 167,539 | 5/1934 | Switzerland | 403/43 |
| 114,950 | 4/1918 | United Kingdom | 403/157 |

Primary Examiner—Wayne L. Shedd
Attorney, Agent, or Firm—Gifford, Chandler, Sheridan & Sprinkle

[57] ABSTRACT

A clevis is formed from two pieces, a shank and a U-member. The proximal end of the shank is inserted through a hole in the U-member and said end is rolled outwardly to form a flange which prevents distal movement of the shank.

6 Claims, 9 Drawing Figures

CLEVIS

BACKGROUND OF THE INVENTION

The invention deals with a clevis. The latter is used generally as a linkage in the transmission of motion in those cases where a straight rod would be subjected to excessive bending or twisting. Clevises have been commonly formed with the shank and U-member as single piece, usually by casting or forging. This, although quite satisfactory from a performance standpoint, is relatively expensive.

Attempts to make a clevis by other metal forming methods have not been satisfactory. For example, attempts to weld a shank formed from metal rod stock to a U-member formed from bar stock have proved to be expensive because of the added hand operation. Similarly, attempts to insert the proximal end of a shank into a hole in the U-member followed by the staking of the proximal end to form a flange have failed because staking causes the metal to crack.

It is therefore an object of this invention to provide a strong and inexpensive clevis.

STATEMENT OF THE INVENTION

The clevis of the invention is formed from two parts, (a) a shank which is preferably made from thick walled metal tubing and (b) a U-member preferably made from metal bar stock. The proximal end of the shank is inserted inwardly through a hole in the U-member and said end is then rolled outwardly to form a flange which prevents distal or outward movement of the shank. It is an important feature of the invention that such rolling does not effect a cracking of the metal as does staking.

Proximal or inward movement of the shank is prevented, for example, by providing the shank with an annular shoulder which seats against the U-member in a manner such that a portion of the U-member surrounding said hole is sandwiched between the rolled flange of the shank on one side and said shoulder on the other.

The shank may be any suitable shape such as a tubing threaded on the inside, outside or both sides at the distal end of the shank. Similarly, the shank can be a solid rod threaded on the circumference at the distal end thereof. Similarly, the shank may be of other cross sections with suitable provision for means of attaching other linkages thereto.

It is preferred that the clevis of the invention is formed by inserting, preferably by press fitting, the proximal end of the shank through a hole in the bar stock before the U-member is formed. The shank end is then most conveniently rolled followed by the forming of the bar stock into the U-member.

DESCRIPTION OF THE PREFERRED EMBODIMENT

Figure 1:
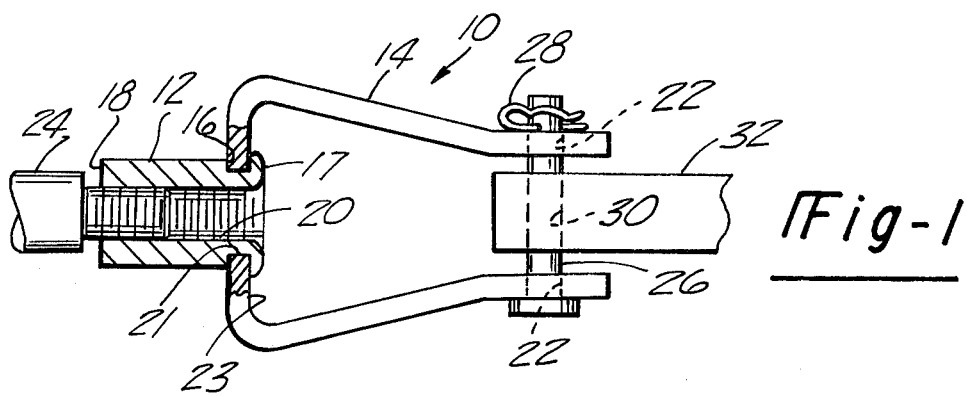
FIG. 1 is a plan view partially in section of an embodiment of the clevis of the invention together with linkages customarily used with a clevis.
Figure 2:
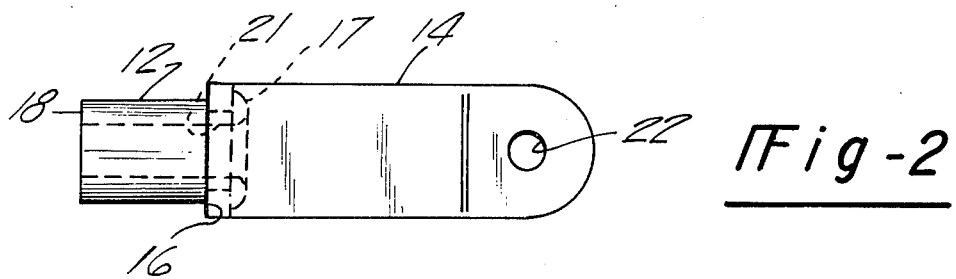
FIG. 2 is a side view of the clevis shown in FIG. 1, portions of FIG. 1 being ommitted for purposes of clarity.

Referring to FIGS. 1 and 2, a clevis, indicated generally as 10, is shown as consisting of two members, a shank 12 and a U-member 14. The shank 12 is in the form of a cylinder, or tubing, having an annular shoulder 16, a proximal end 17, a distal end 18, and an axially threaded hole 20. The U-member 14 is provided with a hole 21, axially aligned holes 22 and an inner shoulder 23.

In the structure shown the rolled end 17 of the shank 12 prevents movement distally of the shank while the abutment of shoulder 16 against the U-member 14 prevents movement proximally of the shank.

Referring to FIG. 1, a shaft 24 is threadedly engaged with shank 12, shaft 24 representing in a general way a means through which motion may be transmitted to the clevis 10. A shaft or bolt 26 is shown held in hole 22 by pin 28, the shaft 26 passing through a hole 30 in a linkage bar 32. The bar 32 represents in a general way a means through which motion may be transmitted from the clevis 10.

Figure 3:
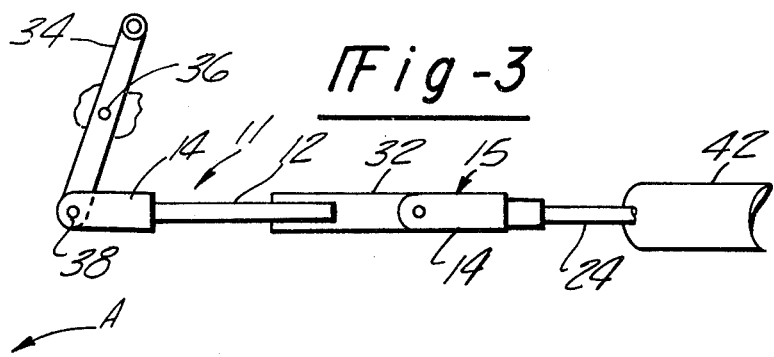
FIG. 3 illustrates diagrammatically a typical use for the clevis of the invention; that is, as a link in a gear shift assembly.
Figure 4:
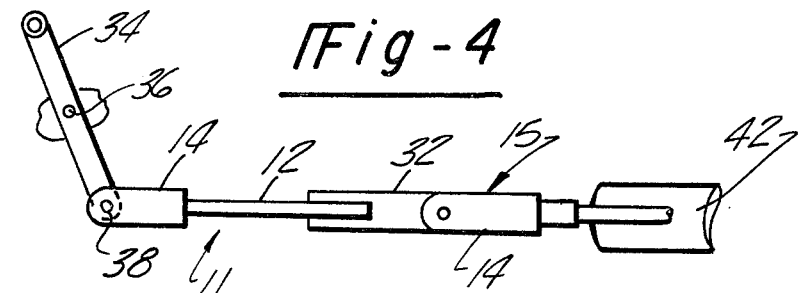
FIG. 4 is similar to FIG. 3 except that the gear shift is in an alternative position.

Referring to FIGS. 3 and 4, a gear shift is shown diagrammatically. The lever 34 rotates about pivot 36. A first clevis 11 is attached to the bottom of the lever 34 in a manner to pivot about pivot 38. The clevis 11 is linked with bar, or intermediate linkage, 32 (see FIG. 1) which is linked to a second clevis 15, the latter being linked to shaft 24 (see FIG. 1). The shaft 24 is secured to a gear adjusting means represented symbolically by 42.

Figure 5:
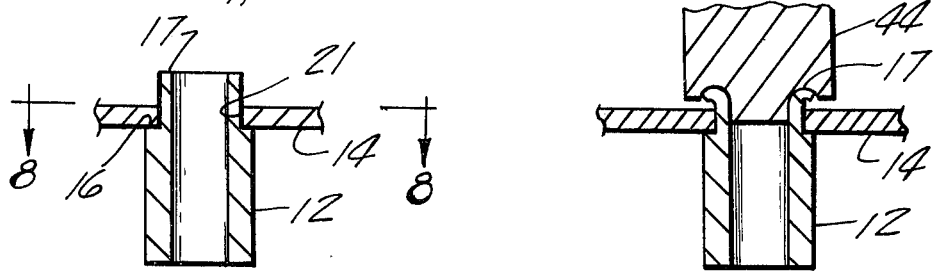
FIG. 5 is a sectional view of the shank and a portion of the U-member prior to the outward rolling of the proximal end of the shank.

When the lever 34 is moved from its position in FIG. 4 to its position in FIG. 5, as indicated by arrow A, the clevis pivots at point 38 relative to gear shift 34 and transmits motion to the right (as shown) to clevis 11, linkage bar 32, clevis 15, and shaft 24.

Figure 6:
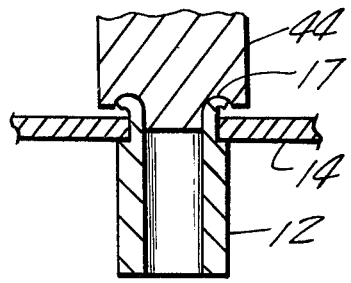
FIG. 6 is similar to FIG. 5 and illustrates the outward rolling of the proximal end of the shank.
Figure 7:
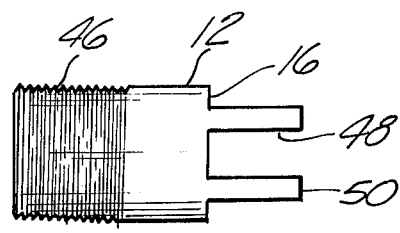
FIG. 7 is a plan view of a second embodiment of a shank suitable for use on the clevis of the invention.

FIGS. 6 and 7 illustrate the preferred method of forming the clevis of the invention. The shank 12 is press fitted through the hole 21 in a piece of steel bar stock which is adapted to be shaped into the U-member 14 in a subsequent step. A rolling tool 44, in a well known industrial procedure, rolls the end 17 of the shank 12 outwardly to form a flange. FIG. 6 shows the end 17 partly rolled outwardly and FIGS. 1 and 2 show it completely rolled outwardly. When the end 17 has been completely rolled against the bar 14 the latter is then shaped to its final U-form as it appears in FIG. 1.

FIG. 7 shows an alternative form of the shank 12. In the embodiment shown the shank 12 is a substantially solid cylinder, is threaded as at 46 on the circumference at its distal end, and is provided with a hole 48 on its proximal end in a manner to form annular ring 50. Ring 50 is rolled outwardly in the manner described above.

Figure 8:
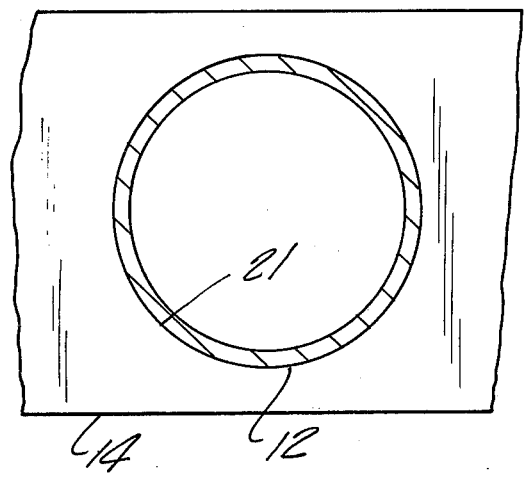
FIG. 8 is a view along the line 8—8 of FIG. 5.
Figure 9:
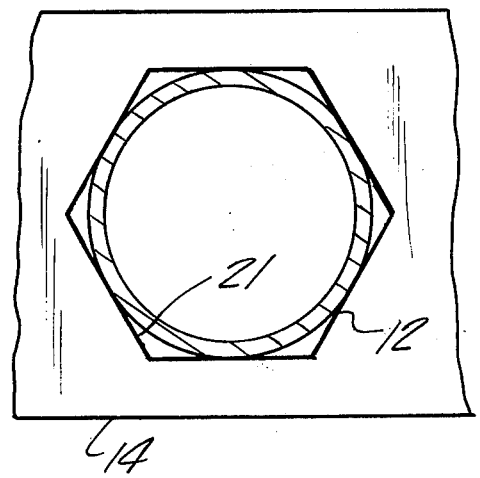
FIG. 9 is a view similar to that of FIG. 8 except that the hole in the U-member is hexagonal instead of circular.

As illustrated in FIGS. 8 and 9; which show the hole 21 in the U-member 14 as circular and hexagonal, respectively; the hole 21 can be any shape such as circular, oval, polygonal, or the like. A non-circular hole has the advantage that the rolling tool 44 (see FIG. 6) forces metal into the opening between the shank 12 and the U-member 14 to offset any tendency for the shank 12 to rotate in the hole 21. Such tendency to rotate is encountered where the shank is subjected to relatively high torque stresses.

I claim:

1. In a clevis comprising a U-member and a shank provided with ends respectively proximal and distal to said U-member, the improvement which comprises:
   a. said shank and said U-member being formed from separate pieces;
   b. said U-member provided with a hole in the bight thereof; said shank being tubular and formed of a deformable material;
   c. said proximal end of said shank having an annular shoulder formed thereon which abuts against said U-member, said shank being positioned in said hole and the terminal portion of said proximal end extending through and beyond said bight, and
   d. an outwardly extending flange formed by said terminal portion, said flange extending retrorsely into engagement with the periphery of said hole on the inner surface of said bight whereby said U-member is sandwiched between said flange and said annular shoulder to prevent both distal and proximal movement of said shank.

2. The clevis as defined in claim 1 wherein said shank is threaded at its proximal end.

3. The clevis as defined in claim 1 wherein said shank is in the form of a cylinder threaded on its outer surface at said distal end.

4. The clevis as defined in claim 1 wherein said shank is in the form of a cylinder with an axially extending bore therein, said bore being threaded at said distal end.

5. The clevis as defined in claim 1 wherein said shank is cylindrical and said hole in said U-member is polygonal.

6. The clevis as defined in claim 1 wherein said hole in said U-member is polygonal.

* * * * *